Nov. 24, 1970  H. SIMON  3,542,603

CELL HOLDER

Filed May 22, 1968  2 Sheets-Sheet 1

HORST SIMON
INVENTOR.

ATTORNEYS

Nov. 24, 1970          H. SIMON          3,542,603

CELL HOLDER

Filed May 22, 1968          2 Sheets-Sheet 2

HORST SIMON
INVENTOR.

BY *William C. Orton, III*
*Robert W. Hampton*

ATTORNEYS

United States Patent Office 3,542,603
Patented Nov. 24, 1970

3,542,603
CELL HOLDER
Horst Simon, Fellbach, near Stuttgart, Germany, assignor to Eastman Kodak Company, Rochester, N.Y., a corporation of New Jersey
Filed May 22, 1968, Ser. No. 731,057
Claims priority, application Germany, June 10, 1967, K 58,006, K 58,007, K 58,008
Int. Cl. H01m 1/04
U.S. Cl. 136—173      5 Claims

ABSTRACT OF THE DISCLOSURE

A device for holding one or more electrical cells in connection with an associated circuit includes at least one cell-connecting contact that is movable toward and away from an inserted cell by a force applied to an extended portion of the movable contact, thus facilitating insertion and removal of the cell from the device. In one embodiment, the extended portion is engageable by hand to effect manual movement of the contact. In another embodiment, the extended portion is engageable by a camming surface on a movable cover to effect automatic movement of the contact upon opening or closing of the cover. In either embodiment, the movable contact may be provided with a beveled surface to further factilitate insertion of a cell in the device.

BACKGROUND OF THE INVENTION

Field of the invention

This invention relates to means adapted to receive and retain in operative orientation one or more electrical cells, and particularly to such means for receiving and retaining one or more electrical cells of the type commonly used with photographic or cinematographic cameras.

Description of the prior art

It is known in the prior art to provide for devices, such as cameras, that require a source of electrical potential a compartment to receive and retain electrical cells in operative relationship with an associated electrical circuit in the device. In such known cell compartments, difficulty has been encountered in the insertion and removal of cells from the compartment. Such difficulty has been a result of two conditions. First, the compartment has usually been of small size, and particularly narrow in width, while the cells to be inserted therein often are of awkward dimensions for handling in such a small space. Second, electrical contacts provided in known compartments usually take the form of contact springs which press resiliently against the contact surfaces of inserted cells in order to connect the cells positively to the associated circuit. Hence, the small size of the compartment, the size and shape of the cells, and the pressure of the contact springs against the cells all make removal of the cells from such compartments difficult.

SUMMARY OF THE INVENTION

The present invention comprises a simple, compact, and inexpensive device for receiving and retaining in operative orientation one or more electrical cells of the type commonly used with photographic or cinematographic cameras. By "operative orientation" is meant that the cell or cells received in the device are placed in electrical contacting relationship with an associated circuit. In use with a camera, for example, such orientation is necessary to provide the voltage requisite for a cell-powered photoflash or exposure-control system.

In the illustrated preferred embodiments of this invention, the device comprises a body portion having a cell-receiving cavity therein and a pair of electrical contacts for connecting a cell received in the cavity to an associated electrical circuit. At least one of the contacts is movable in directions toward and away from a received cell, the movable contact having an extended portion that is engageable by force applying means to move the contact in one of said directions. In the first of the two embodiments illustrated, the extended portion of the movable contact is engageable by hand to effect manual movement of the contact. In the second illustrated embodiment, the extended portion of the movable contact is engageable by camming means mounted on a movable cover or lid for the cavity.

The various objects and advantages of this invention will become apparent in the detailed description of the illustrated embodiments appearing below, and the novel features thereof will be particulaly pointed out in connection with the appended claims.

BRIEF DESCRIPTION OF THE DRAWINGS

In the preferred embodiments described below, reference will be made to the accompanying drawings, in which.

DESCRIPTION OF THE PREFERRED EMBODIMENTS

Figure 1:
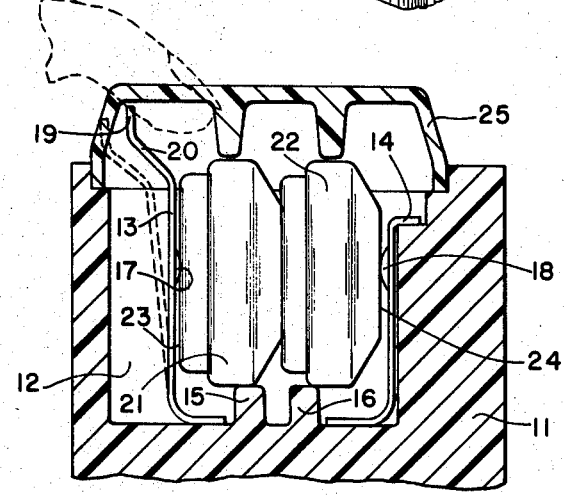
FIG. 1 is a partial cross-sectional view of a cell-holding device illustrating one embodiment of the present invention wherein an electrical contact is movable by hand.

The embodiment shown in FIG. 1 comprises a body portion 11 having a cell-receiving cavity 12 and two electrical cotnacts 13 and 14 for connecting received cells 21 and 22 to an electrical circuit (not shown). Provided on the bottom portion of the cavity 12 are two cell-supporting spacers 15 and 16 which serve to maintain cells 21 and 22 in correct vertical position. On contacts 13 and 14 are raised portions 17 and 18, respectively, which provide electrical contacting engagement with cells 21 and 22 when contact 13 is in the position shown in solid lines. Contact 13 is made as a leaf spring that is biased in the direction of contact 14 to press against cell 21, and thereby retain cells 21 and 22 in electrical contacting engagement, when contact 13 is in the position shown in solid lines, but is movable in the opposite direction, against such biasing force, to the alternate position shown in broken lines. At the upper end of contact 13 is a portion 19 extending above the periphery of cells 21 and 22 in such manner as to be readily engageable by a finger 26 for manual movement of contact 13 away from cell 21. Just below extended portion 19 of contact 13 is a beveled portion 20 for the purpose of facilitating insertion of cells 21 and 22 between contacts 13 and 14. Also shown in FIG. 1 is a lid 25 closing cavity 12 and, at the same time, covering extended portion 19 of contact 13.

Use of the embodiment illustrated in FIG. 1 is very simple. To insert cells 21 and 22, the user of the device must first remove lid 25 from body portion 11. He would then press against extended portion 19 and manually move contact 13 to its position shown in broken lines. Holding cells 21 and 22 oriented as shown, the user would then insert the cells in cavity 12 between contacts 13 and 14. He would then release his hold on extended portion 19, allowing contact 13 to spring back to its initial position shown in solid lines. The biasing influence of spring-contact 13 would then ensure electrical connection of cells 21 and 22 to the associated circuit, and, at the same time, assist in retaining the connected cells in cavity 12 as shown. The user would then replace cover 25 to the position shown. To remove inserted cells 21 and 22 from cavity 12, the user need only remove lid 25, press against extended portion 19, thereby withdrawing contact 13 from cell 21, and either lift cells 21 and 22 out of cavity 12 or turn body portion 11 over and allow cells 21 and 22 to drop out freely.

Figure 2:
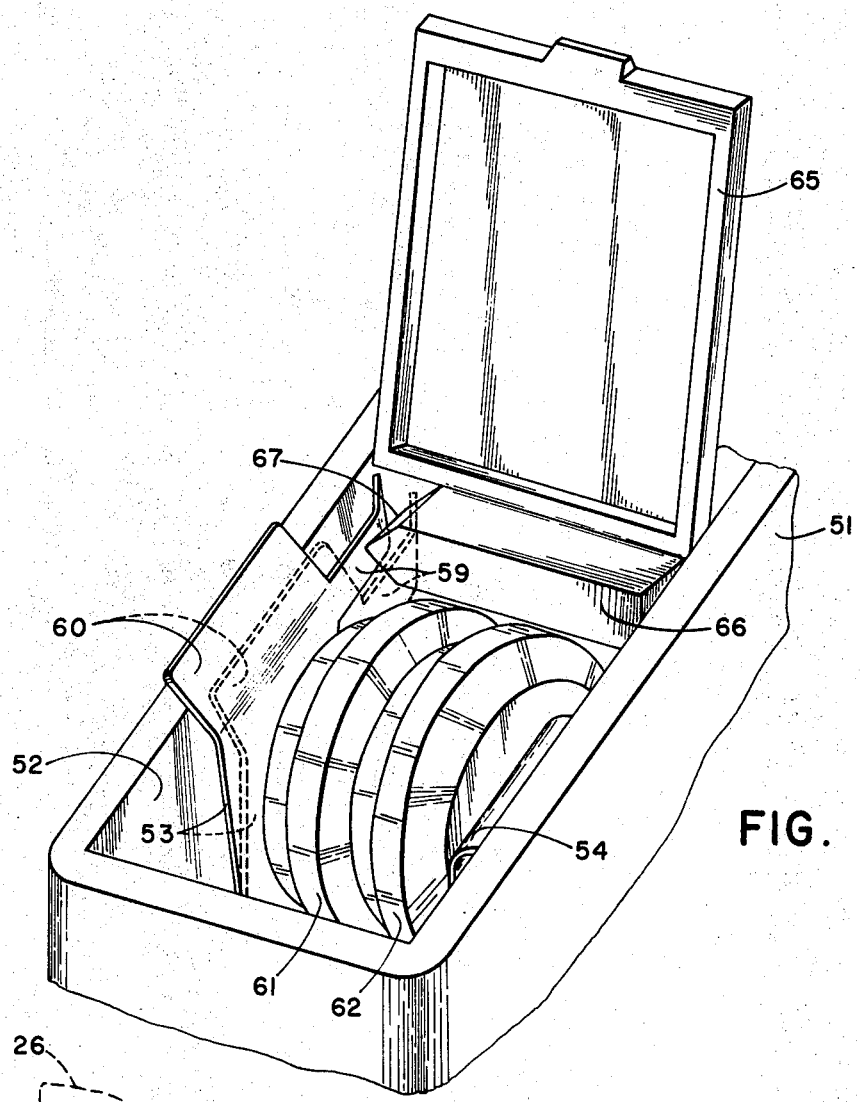
FIG. 2 is a partial perspective view of a cell-holding device illustrating another embodiment of the present invention wherein an electrical contact is movable by camming means on a pivotable cover.

The embodiment illustrated in FIG. 2 is generally similar to that just described with respect to FIG. 1. Hence, the embodiment of FIG. 2 comprises, inter alia, a body portion 51 having a cell-receiving cavity 52 and two electrical contacts 53 and 54, contact 53 being movable relative to contact 54. Movable contact 53 is spring-biased toward contact 54 to retain cells 61 and 62 in electrical contacting engagement with an associated circuit (not shown), as indicated by the position of contact 53 shown in broken lines. Contact 53 has an extended portion 59 engageable by force applying means to effect movement of contact 53, against said spring-bias, toward the position shown in solid lines. The force applying means in this embodiment takes the form of a camming surface 67 provided on an end portion 66 of pivotable lid 65. Camming surface 67 cooperates with extended portion 59 in such a manner that, when lid 65 is moved from its closed position (not shown) to its open position (as shown), camming surface 67 bears against extended portion 59 to move contact 53 from its position of contact with cell 61, as shown in broken lines, to its position of no contact with cell 61, as shown in solid lines. Contact 53 is made of a spring-type material so that the biasing influence thereof causes the return of contact 53 from its position shown in solid lines to its position shown in broken lines upon closing of lid 65. Also shown on contact 53 is a beveled surface 60 provided to facilitate the insertion of cells 61 and 62 in cavity 52 between contacts 53 and 54. In use, the FIG. 2 embodiment thus differs from the FIG. 1 embodiment in that movable contact 53 is automatically disengaged from adjacent cell 61 upon movement of lid 65 to its open position, thus obviating manual movement of any contact.

As a possible modification of the FIG. 2 embodiment, spring-contact 53 could be biased in the direction away from contact 54 so that contact 53 would automatically assume its position shown in solid lines when lid 65 is opened, thus facilitating both insertion and removal of cells 61 and 62. With contact 53 so biased, the configurations of extended portion 59 and camming surface 67 would be correspondingly modified to effect movement of contact 53 to its position shown in broken lines when lid 65 is closed, thus placing cells 61 and 62 in electrical contacting engagement with the associated circuit while retaining the cells in cavity 52.

Figure 3:
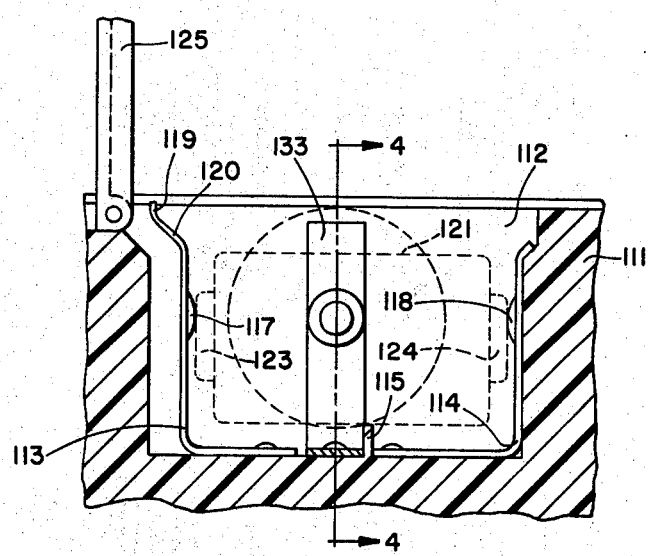
FIG. 3 is a partial cross-sectional view of a cell-holding device illustrating an alternative arrangement that incorporates the embodiment shown in FIG. 1.
Figure 4:
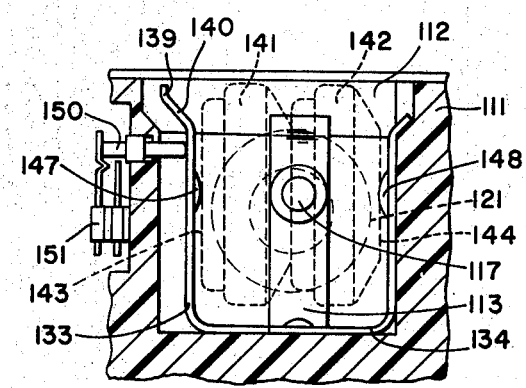
FIG. 4 is a partial cross-sectional view of the device illustrated in FIG. 3 taken along line 4—4 of FIG. 3.
Figure 5:
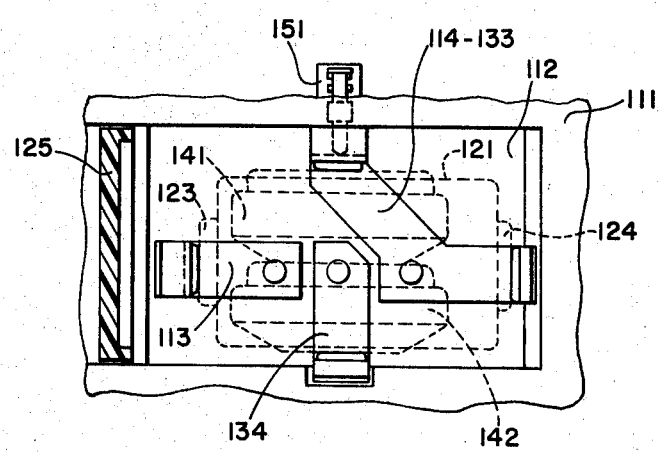
FIG. 5 is a partial plan view of the device illustrated in FIGS. 3 and 4 but slightly modified.

Illustrated in FIGS. 3, 4, and 5 are other arrangements incorporating the embodiment of FIG. 1. These arrangements differ from those shown in FIGS. 1 and 2 in that the arrangements illustrated in FIGS. 3, 4, and 5 can accommodate electrical cells having different shapes and characteristics. To achieve this with the arrangement shown in FIGS. 3 and 4, two pairs of opposing electrical contacts 113, 114 and 133, 134 are provided in a cell-receiving cavity 112 of a body portion 111. Contacts 113 and 114 are provided to accommodate a cell 121 as shown. Raised portions 117 and 118 of contacts 113 and 114, respectively, engage electrical contact surfaces 123 and 124, respectively, of cell 121 received therebetween. Provided at the bottom of cavity 112 is a spacer 115 to maintain correct vertical positioning of cell 121. As in the previously described arrangements, one of the pair of contacts 113 and 114 is movable to facilitate insertion and removal of cell 121. The movable contact in this case is contact 113, having extended portion 119 engageable by hand for manual movement of contact 113, and also having beveled portion 120 to further facilitate insertion of cell 121. Shown in its fully open position in FIG. 3 is a lid 125 which can be pivotally moved to a closed position (not shown) covering cavity 112.

FIG. 4 shows the arrangement of FIG. 3 sectioned along line 4—4 of FIG. 3. Thus shown in FIG. 4 is the second pair of opposing electrical contacts 133 and 134, having raised portions 147 and 148, respectively, which engage the electrical contacting surfaces 143 and 144, respectively, of inserted cells 141 and 142. Movable in this pair of contacts is contact 133 having extended portion 139 and beveled portion 140 for the purposes hereinabove described with reference to FIGS. 1 and 2.

It should be made clear at this point that only one pair of opposing contacts in the arrangement illustrated in FIGS. 3 and 4 can be used at any one time. As shown in FIG 3, only a cell such as cell 121 can be inserted in cavity 112 for engagement by contacts 113 and 114, and then only when no other cell is present. Should cells such as cells 141 and 142 be required, such cells could be inserted in cavity 112 only for engagement by contacts 133 and 134 as shown in FIG. 4, and then only if no other cell is present. Such an arrangement permitting alternative employment of different types of cells would be especially useful in cell holders of a standard design intended for interchangeable use in different models of apparatus, such as photographic or cinematographic cameras, in which one type of cell may be more appropriate for one kind of circuit, such as a photoflash circuit, while another type of cell may be more appropriate for a different kind of circuit, such as an exposure-control circuit. Or, the arrangement of FIGS. 3 and 4 would be equally useful for the purpose of providing alternative connection of different types of cells to a single circuit. For that purpose, in order to provide the circuit continuity appropriate for whichever pair of contacts is being used, switches such as switch 151 are actuatable by control pins such as pin 150. As indicated schematically in FIG. 4, when cells 141 and 142 are inserted between contacts 133 and 134, control pin 150 is moved laterally to open switch 151, thereby disconnecting the circuit from contacts 113 and 114. Similarly, when cell 121 is inserted between contacts 113 and 114, a similar control pin (not shown) is moved to open a similar switch (not shown), thereby disconnecting the circuit from contacts 133 and 134.

FIG. 5 illustrates a slightly modified arrangement in which contacts 114 and 133 of FIGS. 3 and 4 are combined, inasmuch as both of those contacts assume the same polarity. In other respects, the arrangement illustrated in FIG. 5 is substantially the same as that shown in FIGS. 3 and 4. A further modification that could be effected, though not shown, would be the combination of contacts 113 and 134, since those contacts also assume a common polarity. With the contacts in each pair thus combined, a more complicated switching arrangement would be necessary, but such is not considered germain to the present invention.

In summary, with respect to the arrangements illustrated in FIGS. 3, 4, and 5, movable contacts 113 and 133 are engageable at extended portions 119 and 139, respectively, to effect manual movement of said contacts away from their respective cells, thereby facillitating insertion and removal of said cells as hereinbefore discussed.

The invention has been described in detail with particular reference to preferred embodiments thereof, but it will be understood that variations and modifications can be effected within the spirit and scope of the invention as described hereinabove and as defined in the appended claims.

I claim:
1. An article for receiving and retaining in operative orientation an electrical cell, said article comprising:
   a body portion having a cell-receiving cavity;
   a pair of electrical contacts for connecting a cell received in said cavity to an associated electrical circuit, one of said contacts being movable in first and second directions to connect and disconnect a received cell, and having an extended portion engageable by force applying means to effect movement of said contact; and
   a movable lid having a camming surface engageable with said extended portion for applying a force to said extended portion to effect movement of said contact upon movement of said lid.

2. The article claimed in claim 1 wherein said camming surface engages said extended portion to effect movement of said contact in one of said first and second directions upon movement of said lid, and biasing means urges said contact in the other of said first and second directions.

3. The article claimed in claim 1 wherein said contact includes a beveled surface to facilitate insertion of a cell in said cavity.

4. For use in combination with an electrical circuit of a photographic- or cinematographic-camera system, an article to receive and retain in operative orientation an electrical cell, the article comprising:
   a body portion having a cell-receiving cavity and a pair of electrical contacts for connecting a cell received in said cavity to said circuit, one of said contacts being movable in first and second directions to connect and disconnect, respectively, a received cell, said one contact being urged by biasing means in said first direction, said one contact having an extended portion engageable by camming means for moving said contact in said second direction; and
   a lid, mounted on said body portion for movement between an open position and a closed position, having a portion comprising said camming means engageable with said extended portion for moving said contact in said second direction upon movement of said lid toward said open position;
   whereby said one contact is moved in said first direction upon movement of said lid toward said closed position in order to connect a received cell to said circuit and retain said cell in said cavity, and said contact is moved in said second direction upon movement of said lid toward said open position in order to disconnect said cell from said circuit and facilitate insertion of a cell in, and removal of a cell from, said cavity.

5. The article claimed in claim 4 wherein said one contact includes a beveled surface to further facilitate insertion of a cell in said cavity.

References Cited
UNITED STATES PATENTS

| | | | |
|---|---|---|---|
| 2,352,576 | 6/1944 | Triplett | 136—173 |
| 2,589,071 | 3/1952 | Galasso | 136—173 |
| 2,692,944 | 10/1954 | Mendelson | 136—173 XR |
| 2,983,778 | 5/1961 | Munse | 136—173 |
| 3,088,992 | 5/1963 | Lyman | 136—173 |

WINSTON A. DOUGLAS, Primary Examiner

D. L. WALTON, Assistant Examiner